United States Patent
Michel et al.

(10) Patent No.: US 11,834,563 B2
(45) Date of Patent: Dec. 5, 2023

(54) EXPANDABLE VINYL AROMATIC POLYMERS

(71) Applicant: TotalEnergies OneTech Belgium, Seneffe (BE)

(72) Inventors: Jacques Michel, Feluy (BE);
Jean-Claude Deleye, Herne (BE);
Amelio Iacolina, Sirault (BE); Magali Vachaudez, Neufmaison (BE); Laetitia Urbanczyk, La Louviére (BE); Michel Cassart, Braine l'Alleud (BE)

(73) Assignee: TotalEnergies OneTech Belgium, Seneffe (BE)

( * ) Notice: Subject to any disclaimer, the term of this patent is extended or adjusted under 35 U.S.C. 154(b) by 108 days.

(21) Appl. No.: 16/340,717

(22) PCT Filed: Oct. 6, 2017

(86) PCT No.: PCT/EP2017/075487
§ 371 (c)(1),
(2) Date: Apr. 10, 2019

(87) PCT Pub. No.: WO2018/069178
PCT Pub. Date: Apr. 19, 2018

(65) Prior Publication Data
US 2019/0309139 A1    Oct. 10, 2019

(30) Foreign Application Priority Data
Oct. 10, 2016 (EP) ................................. 16193078

(51) Int. Cl.
| | | |
|---|---|---|
| *C08J 9/14* | (2006.01) | |
| *C08J 9/18* | (2006.01) | |
| *C08L 25/08* | (2006.01) | |
| *C08J 9/00* | (2006.01) | |
| *C08J 9/232* | (2006.01) | |
| *C08K 3/04* | (2006.01) | |
| *C08J 9/16* | (2006.01) | |
| *B29C 44/34* | (2006.01) | |
| *B29C 44/36* | (2006.01) | |

(52) U.S. Cl.
CPC .......... *C08J 9/141* (2013.01); *B29C 44/3442* (2013.01); *B29C 44/3465* (2013.01); *B29C 44/36* (2013.01); *C08J 9/0061* (2013.01); *C08J 9/0066* (2013.01); *C08J 9/16* (2013.01); *C08J 9/18* (2013.01); *C08J 9/232* (2013.01); *C08K 3/04* (2013.01); *C08J 2201/024* (2013.01); *C08J 2201/03* (2013.01); *C08J 2203/14* (2013.01); *C08J 2325/04* (2013.01); *C08J 2325/08* (2013.01); *C08J 2453/00* (2013.01); *C08J 2491/06* (2013.01)

(58) Field of Classification Search
CPC . B29C 44/3442; B29C 44/3465; B29C 44/36; C08F 12/00; C08F 2/44; C08J 9/0061; C08J 9/0066; C08J 9/141; C08J 9/16; C08J 9/18; C08J 9/232; C08J 2201/024; C08J 2201/03; C08J 2203/14; C08J 2325/04; C08J 2325/08; C08J 2453/00; C08J 2453/02; C08J 2491/06; C08K 3/04; C08K 2201/005; C08L 25/04; C08L 53/025
See application file for complete search history.

(56) References Cited

U.S. PATENT DOCUMENTS

| | | |
|---|---|---|
| 4,795,763 A | 1/1989 | Gluck et al. |
| 2011/0046249 A1* | 2/2011 | Ponticiello ............. C08J 9/0066 521/60 |
| 2011/0213045 A1 | 9/2011 | Handl |
| 2015/0337101 A1 | 11/2015 | Frohs et al. |
| 2015/0353701 A1 | 12/2015 | Urbanczyk et al. |

FOREIGN PATENT DOCUMENTS

| | | |
|---|---|---|
| DE | 19910257 A1 | 9/2000 |
| DE | 202010013850 U1 | 12/2010 |
| EP | 0372343 A1 | 6/1990 |
| EP | 0620246 A1 | 10/1994 |
| EP | 0674674 A1 | 10/1995 |
| EP | 0863175 A2 | 9/1998 |
| EP | 0902804 A1 | 3/1999 |
| EP | 0915127 A2 | 5/1999 |
| EP | 0981575 A1 | 3/2000 |
| EP | 1102807 A1 | 5/2001 |
| EP | 1137701 A1 | 10/2001 |

(Continued)

OTHER PUBLICATIONS

Heinrich Predel, "Petroleum Coke", Ullmann's Encyclopedia of Industrial Chemistry, Weinheim, Germany, Wiley-VCH Verlag GmbH & Co. KGaA, (Dec. 15, 2006) vol. 25; pp. 501-514.

R. A. Hall; R. D. Hites; P. Plantz, "Characterization of rubber particle size distribution of high-impact polystyrene using low-angle laser light scattering", J. Appl. Polym. Sci., (1982), vol. 27, pp. 2885-2890.

F. R. Feret, "Determination of the crystallinity of calcinated and graphitic cokes by X-ray diffraction", Analyst, (Apr. 1998), vol. 123, pp. 595-600.

(Continued)

*Primary Examiner* — Irina S Zemel
(74) *Attorney, Agent, or Firm* — Kolitch Romano Dascenzo Gates LLC

(57) ABSTRACT

The present invention is related to expandable vinyl aromatic polymers comprising comminuted coke, said comminuted coke having an average stack height (Lc) of carbon crystallites at least 4 nm, a volume median particle diameter (D50) comprised between 1 and less than 5 μm and being characterized by a span (D90–D10)/D50 below 2.5 Molded parts produced from the expandable vinyl aromatic polymers prove low thermal conductivities for a low foam density.

12 Claims, 1 Drawing Sheet

(56) References Cited

FOREIGN PATENT DOCUMENTS

| | | |
|---|---|---|
| EP | 1486530 A1 | 12/2004 |
| EP | 1877473 A2 | 1/2008 |
| EP | 1945700 A1 | 7/2008 |
| EP | 2274370 A1 | 1/2011 |
| EP | 2358798 A1 | 8/2011 |
| EP | 2454313 A2 | 5/2012 |
| EP | 2513209 A1 | 10/2012 |
| JP | 2005002268 A | 1/2005 |
| WO | 9006339 A1 | 6/1990 |
| WO | 9745477 A1 | 12/1997 |
| WO | 9851735 A1 | 11/1998 |
| WO | 0043442 A1 | 7/2000 |
| WO | 2004087798 A1 | 10/2004 |
| WO | 2008061678 A2 | 5/2008 |
| WO | 2010128369 A1 | 11/2010 |
| WO | 2010141400 A1 | 12/2010 |
| WO | 2011042800 A1 | 4/2011 |
| WO | 2011110333 A1 | 9/2011 |
| WO | 2011122034 A1 | 10/2011 |
| WO | 2011133035 A1 | 10/2011 |
| WO | 2013064444 A1 | 5/2013 |
| WO | 2014063993 A1 | 5/2014 |
| WO | 2014102137 A2 | 7/2014 |
| WO | 2014102139 A2 | 7/2014 |
| WO | 2014122190 A1 | 8/2014 |

OTHER PUBLICATIONS

N. Iwashita; C. Rae Park; H. Fujimoto; M. Shiraishi; M. Inagaki, "Specification for a standard procedure of X-ray diffraction measurements on carbon materials", Carbon, (2004), vol. 42, pp. 701-714.

J. Maire; J. Mering, "Croissance Des Dimensions Des Domaines Cristallins Au Cours de la Graphitation du Carbone" Proc. 4th Conference on Carbon, Pergamon Press, (1960), p. 345-350.

C. R. Houska; B. E. Warren, "X-Ray study of the graphitization of carbon black", J. of Applied Physics, (Dec. 1954), vol. 25, No. 12, pp. 1503-1509.

International Search Report issued in Application No. PCT/EP2017/075487, dated Nov. 29, 2017, 4 pages.

Pascal Puech et al., "New insight on carbonisation and graphitisation mechanisms as obtained from a bottom-up analytical approach of X-ray diffraction patterns"; Carbon 147 (2019) pp. 602-611.

* cited by examiner

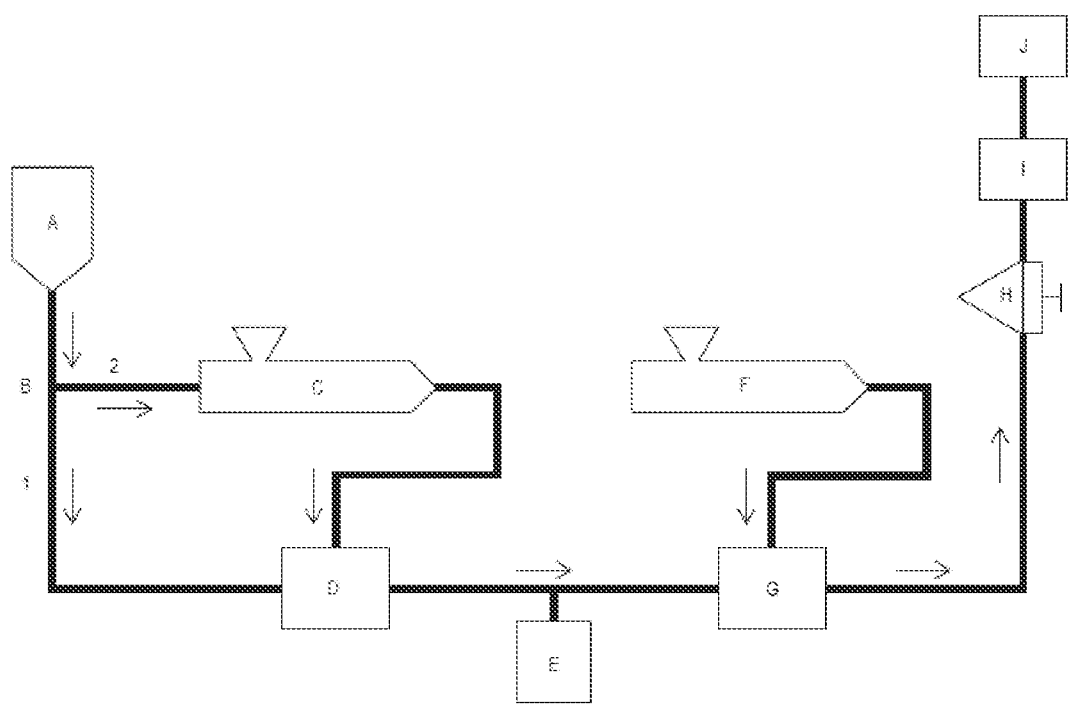

EXPANDABLE VINYL AROMATIC POLYMERS

CROSS-REFERENCE TO RELATED APPLICATIONS

This application claims the benefit of PCT/EP2017/075487 filed Oct. 6, 2017, which claims priority from EP 16193078.9 filed Oct. 10, 2016, which are incorporated herein by reference in their entireties for all purposes.

FIELD OF THE INVENTION

The present invention relates to particulate expandable vinyl aromatic polymers containing coke particles, their production and foams produced therefrom.

STATE OF THE ART

Expanded vinyl aromatic foams, in particular polystyrene foams have been known for a long time and have numerous applications in many fields. Such foams are produced by heating polystyrene particles impregnated with blowing agents in a prefoamer to achieve an expansion in one or two steps. The expanded particles are then conveyed in a mold where they are sintered to achieve molded parts. In the case of thermal insulation panels, the molded parts are blocks of about 1 m thickness which are later cut into the requested panel thickness.

Without any athermanous additives (defined as "absorbing or reflecting radiant heat in certain wave-length regions of the infra-red spectrum"), panels of expanded polystyrene foams have a minimum thermal conductivity at densities around 30 kg/m$^3$ and only values of more than about 34 mW/m·K can be achieved. To save material and to increase the insulation performance, it is nevertheless desirable to use foam boards having lower densities, in particular 15 kg/m$^3$ or even less. The production of such foams is not a problem in technical terms. However, without athermanous particles, such foam boards have a drastically worse thermal insulation performance so that they do not meet the requirements of the requested thermal conductivity classes. The thermal conductivity usually exceeds 36 mW/m·K; typically, a thermal conductivity of 38 and 36 mW/m·K can be achieved with a foam density of around 14 and 18 kg/m$^3$, respectively.

Since the early patents U.S. Pat. No. 4,795,763 (1989), WO 90/06339 and EP 0372343 (1989), it is known that the thermal conductivity of foams can be reduced by incorporating athermanous materials such as carbon black.

Though carbon black was the initial athermanous filler being patented in thermal insulating foam applications, its infrared blocking efficiency has been proven to be dependent on the carbon black type. Several patent applications have been filed claiming improved thermal insulation performances for foams obtained by expandable polystyrene (EPS) containing specific carbon black grades (WO 97/45477, EP 0674674, WO 2004/087798, WO 2008/061678, WO 2011/042800). Characteristics such as primary particle size, specific surface area (BET), oil absorption number (OAN), sulfur content (linked to styrene suspension stability), electrical resistivity, iodine number, volatile and ash content or a combination of said characteristics, are linked to the infrared blocking effects.

Other fillers such as coke, graphite, metal oxides, metal powder or pigments have been proposed as well; their incorporation in expandable vinyl aromatic foams is for example disclosed in EP 1486530, EP 620246, EP 0915127, EP 1945700, EP 1877473, EP 372343, EP 902804, EP 0863175, EP 1137701, EP 1102807, EP 0981575, EP 2513209, EP 0915127, DE 19910257, WO 9851735, WO 2004/087798, WO 2011/042800, WO 2011/133035, WO 2011/122034, WO 2014/102139 and JP 2005002268.

Incorporation of carbon coke as athermanous filler is for example disclosed in EP 2274370, EP 2358798, EP 2454313, US 2011/213045, DE 202010013850, WO 2010/128369, WO 2010/141400, WO 2011/110333, WO 2013/064444, WO 2014/063993, WO 2014/102137 and WO 2014/122190.

EP 2274370 discloses expandable vinyl aromatic polymers comprising, calculated with respect to the polymer, from 1 to 10% by weight of an expanding agent and from 0.05 to 25% by weight of a filler comprising coke with an average particle diameter (determined by laser light diffraction spectroscopy) comprised between 0.5 and 100 μm and with a surface area, measured according to ASTM D-3037/89 (BET), ranging from 5 to 50 m$^2$/g. The expanded polystyrene foams of examples 1 to 11 are characterized by a thermal conductivity comprised between 30.5 and 36.5 mW/m·K for a foam density of 17 g/l. Both anode and needle coke are illustrated. Particle size and particle size distribution of the coke filler are not referred as determinant for thermal conductivity. The average particle size D50 values of the cokes used in the examples are 5 μm for anode coke Asbury 4023 and 6 μm for needle coke Asbury 4727.

US 2011/213045 patent application relates to a molded body made of polystyrene, comprising petroleum coke particles, preferably anisotropic coke particles with a grain size in the range between 1 and 50 μm. The petroleum coke is used at an amount comprised between 0.5 and 10% by weight with respect to the weight of the finished body. The body comprising the petroleum coke is characterized by a thermal conductivity which is reduced by 25 to 35% compared to the thermal conductivity of the body without the petroleum coke. Coke having a platelet shape and characterized by a high aspect ratio is claimed to perform better than isotropic coke.

In WO 2010/141400, petroleum coke is added at 2 to 5% by weight to extruded thermoplastic polymer foam. In the examples, 2% by weight of petcoke HC59803 (from HC Carbon), with a reported diameter of 3 μm, is added. A thermal conductivity of 32.1 mW/(m·K) is reported for a density of 31.2 g/l.

WO 2011/110333 relates to building material having thermally insulating properties, wherein the building material contains petroleum coke particles, in particular calcined petroleum coke, characterized by a median particle size comprised between 1 and 50 μm, an aspect ratio comprised between 1 and 500 and a surface area (BET) comprised between 3 and 50 m$^2$/g. The building material is a nonmetallic inorganic material and/or a natural material and/or a synthetic polymer apart from polystyrene.

EP 2358798 discloses expandable vinyl aromatic polymers comprising, calculated with respect to polymer, 1 to 10% by weight of an expanding agent embedded in the polymeric matrix; 0 to 25% by weight of a filler comprising carbon coke having an average diameter of between 0.5 and 100 μm, with a surface area, measured according to ASTM D-3037/89, ranging from 5 to 200 m$^2$/g; 0.05 to 10% by weight of expanded graphite in particle form, with a particle average diameter (size) ranging from 1 to 30 μm, a surface area, measured according to ASTM D-3037/89, ranging from 5 to 500 m$^2$/g and a density ranging from 1.5 to 5 g/cm$^3$. In the comparative examples with coke as the sole filler (no expanded graphite), thermal conductivities of 32.5 mW/(m·K) and 33 mW/(m·K) are reported for a density of 17 g/l and 4% Asbury needle coke 4727 (D50: 6 μm) and Asbury anode coke 4023 (D50: 5 μm), respectively. As claimed in the patent and illustrated by several examples, thermal conductivity values are decreased when expanded graphite is blended with coke while an enhanced fire resistance is obtained.

EP 2454313 discloses thermo-insulating expanded articles having a density ranging from 5 to 50 g/l, which are obtained from a blend comprising from 10 to 90% by weight of beads/granules of expandable vinyl aromatic polymer pigmented with an athermanous material comprising from 0.05 to 25% by weight of coke in particle form with an average particle diameter ranging from 0.5 to 100 μm and from 90 to 10% by weight of beads/granules of essentially white expandable vinyl aromatic polymer. In comparative examples 1 and 2, wherein no blending with white EPS is performed, a thermal conductivity of 31 mW/m·K is reported for EPS boards with a density of 17 g/l and 16 g/l, comprising 6% by weight of coke Asbury 4357 (D50: 5 μm, BET: 20 m$^2$/g).

WO 2010/128369 discloses thermo-insulating expanded articles with improved resistance to solar irradiation, which comprise an expanded polymeric matrix, obtained by expansion and sintering of beads/granules of a vinyl aromatic (co)polymer, in whose interior a filler is homogeneously dispersed, which comprises from 0.1 to 10% by weight of at least one athermanous material selected from coke, graphite and carbon black and optionally from 0 to 10% by weight of an inorganic additive, active within the wave-lengths ranging from 100 to 20,000 cm$^{-1}$ and which are known, for example from WO 2000/43442, to function as an athermanous component. Low concentrations of coke (typically 0.8-1.5%) are favoured to reduce solar heat build-up. In examples 1 to 4, coke Asbury 4357 (D50: 5 μm) is the athermanous filler and thermal conductivity of 32-32.5 mW/m·K values are reported for 18 g/l EPS boards.

WO 2014/122190 relates to rigid polystyrene foams containing thermally treated non-graphitic anthracite coke particles, mouldings containing such rigid polystyrene foams, and the use of such mouldings for heat insulation. The examples show a thermal conductivity comprised between about 31 and about 33 mW/m·K for a foam density comprised between about 14 and about 15 g/l. Thermal conductivity is measured after a 24-hour conditioning at room temperature.

WO 2014/063993 relates to a concentrated polymeric composition which comprises, calculated with respect to the overall composition: a) from 10% to 90% by weight of at least one vinyl aromatic (co)polymer; b) from 0.01% to 5% by weight of at least one compound containing epoxy functional groups; c) from 10% to 90% by weight of at least one infrared absorbing agent, wherein the infrared absorbing agent is selected from graphite, carbon black or coke. A fundamental aspect of the invention is the preparation of a master batch. The expanded polystyrene foams of the examples are characterized by a thermal conductivity of 30.3 to 30.6 mW/m·K for a foam density of about 16 g/l (15.9-16.6 g/l) with a reported coke content of 5.1-5.5%. The coke (Asbury 4023) has a reported D50 of 5 μm.

DE 202010013850 discloses expandable vinyl aromatic polymers comprising carbon comprising athermanous particles characterized in that the carbon atoms are partly graphically structured while turbostratic. In the examples, expanded polystyrene comprising respectively graphite, petroleum coke with share of graphitic areas of 4.4% and meta-antracite with share of graphitic areas of 70% were compared for thermal conductivity at a foam density of 16 g/l. The values reproduced are those as obtained for foam panels after storage until constant weight. The coke particles have a platelet morphology with an aspect ratio of 30 to 40 and D50 values of 7 μm. Reported thermal conductivity values are 29.3 mW/m·K and 30.2 mW/m·K for 16 g/l with 8 and 4% coke loading, respectively.

WO 2013/064444 relates to a composition based on self-extinguishing expandable vinyl aromatic polymers, which comprises: a) a vinyl aromatic (co)polymer; b) at least one expandable system; c) at least one flame-retardant additive; d) at least one synergetic additive containing a C—C or C—O—O—C thermolabile bond; and e) at least one athermanous additive selected from carbon-black, a graphite, a carbon coke in particle form and mixtures thereof; said composition further being characterized in that it contains a stabilizing additive including at least one tin alkyl mercapto-ester. The carbon coke is characterized by an average diameter (d50) comprised between 0.5 and 100 μm, and a surface area (BET) comprised between 5 and 200 m$^2$/g and is present in an amount between 0.1 and 20% by weight on the polymer. The examples based on 2% by weight of coke (Asbury 4023), all show a relatively high thermal conductivity of about 34.5 mW/m·K for a foam density of about 16.5 g/l.

WO 2014/102137 is related to expandable vinyl aromatic polymers comprising comminuted petroleum coke with a polymodal particle size distribution. The foams obtained from said expandable polymers prove a reduced thermal conductivity at a reduced foam density. The examples as illustrated, all show a thermal conductivity comprised between about 32 and about 35 mW/m·K for a foam density comprised between about 14 and about 16 g/l. The coke used in the examples, Mechano REM 5 from HC Carbon and Timcal PC40 is characterized by D50 values (measured on as received coke) of 6.7 and 12.6 μm, respectively. Analysis of the coke particle size distribution (PSD) after extrusion processing reveals a strong reduction of particle size. Lowest thermal conductivities are claimed when the volume percentage of coke particles with a diameter below 3 μm in EPS is less than 40 and the volume percentage of particles with a diameter comprised between 3 and 20 μm is higher than 45.

Without contesting the associated advantages of the state of the art systems, it is nevertheless obvious that there is still a need for expandable vinyl aromatic polymers, in particular styrene polymers which can be converted in molded parts characterized by a low foam density in combination with a low thermal conductivity.

AIMS OF THE INVENTION

The present invention aims to provide expandable vinyl aromatic polymers that do not present the state of the art shortcomings; in other words, to provide expandable vinyl aromatic polymers enabling the production of expanded beads allowing molded parts such as insulation panels with reduced thermal conductivity in combination with a low foam density, said molded parts obtained in an economically attractive and a safe way.

DRAWINGS

FIG. 1 represents a flow-sheet for the production of expandable vinyl aromatic polymer wherein:
  (A) is the polymerization reactor producing a polymer stream;

(B) is the branching point where part of the polymer stream is derived creating a polymer side stream (2) main polymer stream (1);

(C) is the mixing unit, preferably an extruder, where comminuted coke particles and foam cell regulator, preferably polyethylene wax are dispersed in the derived polymer side stream (2);

(D) is the merging point where both polymer streams (1, 2) join through a static mixer forming a new polymer stream;

(E) is the unit for the addition of blowing agent, preferably n-pentane and/or isopentane, to the new polymer stream;

(F) is the extruder where flame retardant agent and synergist are blended, optionally with vinyl aromatic polymer, before being fed into the new polymer stream through (G) to form the expandable vinyl aromatic polymer melt;

(H) is the under-water pelletizing unit;

(I) is the drying unit;

(J) is the packaging unit.

SUMMARY OF THE INVENTION

The present invention discloses expandable vinyl aromatic polymers comprising at least one blowing agent and homogeneously dispersed coke particles, said coke particles being characterized by an average stack height (Lc) of carbon crystallites of at least 4 nm and a volume median particle diameter (D50) comprised between 1 and less than 5 μm, preferably between 1.5 and 4.5 μm and a span (D90–D10)/D50 below 2.5, preferably below 2.3, more preferably below 2.2, as obtained from laser light scattering measurements according to ISO 13320.

Preferred embodiments of the present invention disclose one or more of the following features:
the coke particles are characterized by a volume percentage of particles with a diameter of less than 1 μm of lower than (36–13 ln D50);
the coke particles are characterized by a volume percentage of particles with a diameter of less than 1 μm of lower than (32–12 ln D50);
the expandable vinyl aromatic polymers comprise between 3 and 8% by weight, preferably 4 and 6% by weight of coke;
the expandable vinyl aromatic polymers comprise between 2 and 10% by weight, preferably between 3 and 7% by weight of a C3-C6 alkane, preferably a C4-C5 alkane blowing agent.
the expandable vinyl aromatic polymers additionally comprise:
between 0.1 to 5% by weight, preferably between 0.2 and 3.0% by weight of an halogenated polymer, preferably a brominated styrene butadiene block copolymer with a bromine content comprised between 40 and 80% by weight;
between 0.05 and 5% by weight, preferably between 0.1 and 3.0% by weight, more preferably between 0.1 and 1.0% by weight of flame retardant synergist, preferably a thermal free radical generator of the type comprising a C—C— or a C—O—O—C thermo-labile bond; and
between 0.01 and 1.0, preferably between 0.05 and 0.5% by weight, more preferably between 0.08 and 0.40% by weight of polyethylene wax, as cell regulator, characterized by a weight average molecular weight comprised between 1500 and 5000 Da.

The present invention further discloses a method for the preparation of beads or granules of the expandable vinyl aromatic polymer, comprising the steps of:
a) producing a polymer melt stream after the polymerization process;
b) deriving a part of said polymer melt stream and creating a main polymer melt stream (1) and an additional polymer melt stream (2);
c) incorporating the coke particles and the foam cell regulator into the additional polymer melt stream (2);
d) merging the main (1) and the additional (2) polymer melt streams, forming a new polymer melt stream;
e) introducing a blowing agent into the new polymer melt stream;
f) cooling the vinyl aromatic polymer melt comprising all necessary ingredients to a temperature of 200° C. or less;
g) discharging through a die plate with holes, the diameter of which at the exit from the die is comprised between 0.3 and 1.5 mm, preferably between 0.5 and 1.0 mm; and
h) pelletizing the melt comprising blowing agent directly downstream of the die plate under water at a pressure above 3 bar, preferably above 5 bar.

Preferred embodiments of the process for the preparation of beads or granules of the expandable vinyl aromatic polymer disclose one or more of the following features:
the method comprises an additional step of introducing flame retardant agent and synergist into the new polymer melt stream between step f) and step g).
between 5 and 30% of the polymer stream is derived in step b) to form the additional polymer stream (2);
in step c), the coke particles and the foam cell regulator are dispersed in the additional polymer stream (2) by means of an extruder;
the dispersion in step c) is performed in the polymer melt at a temperature comprised between 180 and 250° C., preferably between 200 and 240° C., more preferably between 210 and 230° C.;
in the additional step one or more thermal stabilizer(s) and anti-acids are added.

The present invention additionally discloses polymer foams obtained from the molding of the expanded vinyl aromatic polymers, said foams being characterized by a thermal conductivity, (λ) measured according to ISO 8301, of:
32.5 mW/m·K or less, preferably of 31 mW/m·K or less at a foam density of 12.5 kg/m$^3$ or lower; or
31 mW/m·K or less, preferably of 30.5 mW/m·K or less at a foam density of 15 kg/m$^3$ or lower; or
31 mW/m·K or less, preferably of 30 mW/m·K or less at a foam density of 18 kg/m$^3$ or lower.

DETAILED DESCRIPTION OF THE INVENTION

It is an object of the present invention to provide expandable vinyl aromatic polymers, in particular styrene polymers containing homogeneously dispersed coke particles which can be processed to expanded foams which have both a low density and a low thermal conductivity.

We have found that this object is achieved by expandable vinyl aromatic polymers, in particular styrene polymers, comprising homogeneously dispersed coke particles characterized by an average stack height (Lc) of carbon crystallites higher than 4 nm, a volume median particle diameter (D50) comprised between 1 and less than 5 μm and a span (D90−D10)/D50 lower than 2.5.

By "homogeneously dispersed coke particles", the present invention means that particles with an equivalent diameter of more than 40 μm are observed by less than 1%, preferably by less than 0.5%, more preferably by less than 0.1% in a method analogous to those described in ISO 18553.

The homogeneity of the dispersion of the athermanous particle is quantified on compression-moulded film with a thickness comprised between 10 and 30 μm, preferably of about 20 μm. The film is obtained after melting a few EPS beads at 200° C. to allow release of blowing agent, applying pressure for 15 minutes and cooling to 35° C. under pressure. The film is examined in transmission with an optical microscope (Nikon LV100) using a 20× lens. The dispersed black particles are counted and measured (area and perimeter) with image analyser NIS Element AR. The percentage of area covered by particles with equivalent diameter above 40 μm is calculated on the basis of 10 different image fields (10×290000 μm² or 2.9 mm²). The criterion for an inhomogeneous dispersion is that the percentage area of particles with an equivalent diameter above 40 μm is more than 1%.

$$D_{eq}=(4A/\pi)^{0.5}, \text{ wherein } A \text{ is the projected area of the particle.}$$

The expandable vinyl aromatic polymers of the present invention can be processed to foams with a density of 18 kg/m³ or less, preferably of 16 kg/m³ or less which are characterized by a thermal conductivity of 32 mW/m·K or less in accordance to ISO 8301 and self-extinguishing properties, for the case that a suitable flame retardant additive package is present, to pass the burning test B2 (in accordance with DIN 4102).

Expandable vinyl aromatic polymers, in particular styrene polymers, are vinyl aromatic polymers comprising blowing agent, preferably n-pentane and/or isopentane. The size of the expandable polymer beads is preferably in the range from 0.2 to 2 mm, preferably from 1 to 1.5 mm. Molded polymer foams can be obtained via prefoaming and sintering of the appropriate expandable vinyl aromatic polymer beads, in particular of the styrene polymer beads.

The vinyl aromatic polymers preferably used in the present invention comprise general-purpose (also known as glass-clear) polystyrene (GPPS), high impact polystyrene (HIPS), anionically polymerized polystyrene, styrene-alpha-methylstyrene copolymers, acrylonitrile-butadiene-styrene polymers (ABS), styrene-acrylonitrile polymer (SAN), acrylonitrile-styrene-acrylate (ASA), styrene acrylates, such as styrene-methyl acrylate and styrene-methyl methacrylate (SMMA), styrene maleic anhydride (SMA), methyl methacrylate-butadiene-styrene (MBS), methyl methacrylate-acrylonitrile-butadiene-styrene (MABS) polymers, styrene-N-phenylmaleimide copolymers (SPMI) or a mixture thereof.

The weight average molecular weight of the expandable vinyl aromatic polymers, in particular styrene polymers, of the present invention is preferably in the range from 100 kDa to 400 kDa, particularly preferably in the range from 150 kDa to 300 kDa, measured by means of gel permeation chromatography against polystyrene standards. The molar mass of the expandable vinyl aromatic polymers, after the extrusion processes is generally below the molar mass of the vinyl aromatic polymers, before the extrusion process, because of the degradation caused by shear and/or by heat. The molar mass difference due to extrusion can be up to 10 kDa.

The above-mentioned vinyl aromatic polymers can be blended with thermoplastic polymers, such as polyamides (PA), polyolefins, e.g. polypropylene (PP) or polyethylene (PE), polyacrylates, e.g. polymethyl methacrylate (PMMA), polycarbonate (PC), polyesters, e.g. polyethylene terephthalate (PET) or polybutylene terephthalate (PBT), polyphenylene ethers (PPE), polyether sulfones (PES), polyether ketones, or polyether sulfides (PES), or a mixture thereof, generally in total proportions of up to at most 30% by weight, preferably in the range from 1 to 10% by weight, based on the polymer melt, in order to improve mechanical properties or heat resistance, optionally with use of compatibilizers. Mixtures within the above-mentioned ranges of amounts are also possible with, for example, hydrophobically modified or functionalized polymers or oligomers, rubbers, e.g. polyacrylates or polydienes, for example styrene-butadiene block copolymers, or biodegradable aliphatic or aliphatic/aromatic copolyesters.

The coke to be used with the expandable vinyl aromatic polymers of the present invention is obtained from grinding coke, preferably petroleum coke. The petroleum coke used in the present invention is a residue of petroleum distillation and is produced in so-called crackers. The petroleum coke is liberated from the volatile components through calcination, as a result of which a carbon with a degree of purity of about 99% is obtained. Therefore, coke may be regarded as a carbon, but is not included in the allotropic forms. Calcined petroleum coke is neither graphite nor can it be included in the amorphous carbons, like carbon black.

Grinding is preferably performed in a delamination mill, such as for example an air jet mill and preferably a spiral flow mill, in such a way that a particle size distribution (before incorporation in the expandable vinyl aromatic polymer), as determined by the laser light scattering granulometry technique and calculated using the Fraunhofer/Mie model, with a volume median particle diameter (D50) comprised between 1 and 7 μm, preferably between 1 and 5 μm is obtained.

The technique of laser diffraction is based on the principle that particles passing through a laser beam will scatter light at an angle that is directly related to their size: large particles scatter at low angles, whereas small particles scatter at high angles. The laser diffraction is accurately described by the Fraunhofer approximation and the Mie theory, with the assumption of spherical particle morphology.

Concentrated suspensions, comprising about 1.0% by weight of carbon based particles, are prepared using suitable wetting and/or dispersing agents.

Suitable solvents are for example water or organic solvents such as for example ethanol, isopropanol, octane or methyl ethyl ketone. A sample presentation system ensures that the material under test passes through the laser beam as a homogeneous stream of particles in a known, reproducible state of dispersion.

In the present invention, the particle size distribution was measured by laser light scattering using the particle size analyzer (HORIBA 920) from (Horiba Scientific) according to ISO 13320. The samples of expandable vinyl aromatic polymers with coke as filler are dissolved in methyl ethyl ketone at a concentration of about 1% weight, without the use of ultrasonication. This technique is used to characterize rubber particle size distribution in high impact polystyrene (HIPS) since more than 30 years (R. A. Hall, R. D. Hites, and P. Plantz, "*Characterization of rubber particle size distribution of high-impact polystyrene using low-angle laser light scattering*", J. Appl. Polym. Sci. 27, 2885, (1982)).

Particle size measurements are performed on pure solvent, e.g. 150 ml of methyl ethyl ketone, to which either the concentrated suspension of carbon based particles or the solution of expandable vinyl aromatic polymer comprising carbon based particles is added drop by drop until the concentration of carbon based particles is such that a transmission, as displayed by the particle size analyzer (HORIBA 920), comprised between 75 and 90% is obtained.

The petroleum coke to be used in the present invention is selected from a coke being characterized by a particle size distribution which is monomodal or polymodal and by a significant graphitization degree, as revealed by an average stack height ($L_c$) of coke carbon crystallites of at least 4 nm.

It was demonstrated (WO 2014102137) that extrusion conditions of the vinyl aromatic polymer comprising the comminuted coke and optionally other components used for the production of expandable vinyl aromatic polymers are the key for the thermal conductivity reduction capabilities of the incorporated comminuted coke particles.

It has been observed that particular soft dispersion conditions (dispersion into the polymer matrix, through addition into the molten polymer stream) to a large extent improves the delamination of the comminuted coke, while further fragmentation is hardly observed.

These soft extrusion conditions ensure that the absolute value of the difference of the span (D90–D10)/D50 of the coke particles as received from the supplier and the span of the coke particles incorporated into the foam is low, preferably less than 1.5, more preferably less than 1.3, most preferably less than 1. Deviation from these specific extrusion conditions (extrusion of the polymer-coke mix wherein the polymer is in a non-molten state under harsh shear stress conditions) causes mostly fragmentation of the comminuted coke particles resulting in a sizeable increase of the coke fraction with a diameter of less than 1 μm, meanwhile delamination is observed to a lesser extent. On the other hand, too mild extrusion conditions can lead to a non-homogeneous coke dispersion in EPS with agglomerates being formed. Those coke agglomerates ($D_{eq}$>40 μm) are readily quantified by image analysis on thin compression molded films (~20 μm thick) observed by optical microscopy in a fashion similar to that described for carbon black dispersion in ISO 18553.

Using OCS (Optical Control System), it has been demonstrated that there is less gel-formation in the vinyl aromatic polymer, when prepared according to proper extrusion conditions. These gels, in general having a diameter of 100 μm or more, result from the agglomeration of the small coke particles. Contrary to the small coke particles, these agglomerates reflect less infrared irradiation, thus negatively influencing the insulation properties of the derived foam panels.

Further, it has been observed that the presence of gels has a negative influence on the proportion of closed cells in the foam, once more negatively influencing the insulation properties of the foam.

It has been demonstrated that improper dispersion conditions result in a gel-formation that is about ten times that of using proper dispersion conditions easily reached by dispersing the coke particles directly into the molten polymer matrix.

Thus, within the scope of the present invention, it has been observed that the dispersion of the comminuted coke particles directly into the molten polymer matrix generates so called proper dispersion conditions (for example extrusion conditions) of the vinyl aromatic polymer comprising the comminuted coke and optionally other components used for the production of expandable vinyl aromatic polymers.

The coke particles for being dispersed in the molten polymer are characterized by a volume median particle diameter (D50) comprised between 1 and 7 μm, preferably between 1 and 5 μm and a span (D90–D10)/D50 lower than 3.0, preferably lower than 2.7, more preferably lower than 2.5, said characteristics being typical to the coke particles after grinding, i.e. as obtained from the supplier.

Proper dispersion conditions result in homogeneously dispersed coke particles as revealed by optical microscopy observations on compression molded films as alluded above, said coke particles being characterized by a monomodal or polymodal particle size distribution, with a volume median particle diameter (D50) comprised between 1 and less than 5 μm, preferably between 1.5 and 4.5 μm and a span lower than 2.5, preferably lower than 2.3, as obtained from laser light scattering measurements according to ISO 13320.

The inventors have further observed that coke particles, incorporated into the foam according to soft conditions, preferably are characterized in that the volume percentage of particles with a diameter of less than 1 μm is lower than 36–13 ln D50 (36 minus 13 times the natural logarithm of D50) preferably lower than 32–12 ln D50.

For expandable foams comprising particles having a volume median particle diameter (D50) comprised between 1 and less than 5 μm, preferably between 2 and 4.5 μm, said criteria contributes to the thermal conductivity of the expanded foam, whereas values exceeding 36–13 ln D50 have a negative influence (increased thermal conductivity).

Improper dispersion conditions, for example where solid polymer and comminuted coke particles are mixed and molten via a master batch in an extruder and subsequently extruded in a second step on an extruder (often with a milder screw profile), result in a too high degree of fragmentation of the comminuted coke causing an increase of the volume percentage of particles with a diameter of less than 1 μm.

For the particular case of expanded polystyrene comprising coke particles with a D50 value within the range of from 2 to 4 μm, it has been observed that optimal reduced thermal conductivity values are obtained for a volume percentage of particles with a diameter of less than 3 μm, of more than 40.

Foams with a density of less than 18 kg/m$^3$ and even less than 16 kg/m$^3$ obtained from the expansion and molding of expandable polystyrene (EPS) obtained from the above proper extrusion conditions are characterized by a thermal conductivity of less than 32 mW/m·K and even less than 31 mW/m·K.

Thermal conductivity is determined by ISO 8301 using a heat flow meter device, with a mean temperature of 10° C. and a temperature difference of 20° C. The samples are kept in an oven at 70° C. for 7 days before measuring the A-value.

The particle size distribution has been measured by laser light scattering using the particle size analyzer (HORIBA 920) from (Horiba Scientific) and calculated using the Fraunhofer/Mie model.

The measurement method is analogous to the protocol used for the determination of the apparent diameter of styrene-butadiene-styrene particles in high impact polystyrene (HIPS).

Concentrated suspensions of carbon-based particles are prepared in methyl ethyl ketone at a concentration of about 1% by weight, without the use of ultrasonication. The expandable vinyl aromatic polymer particles are dissolved in the solvent while the carbon-based particles are dispersed; the dissolution time is about 30 minutes.

Coke with a crystallite stacking height (Lc) of at least 4 nm (mostly of the needle coke variety), homogeneously dispersed in the continuous phase of the expandable vinyl aromatic polymer, preferably is characterized by a carbon crystallite stacking height ($L_c$) comprised between 4 and 10 nm, a graphitization degree (g) comprised between −0.21 and 0.0, and an interlayer spacing ($d_{002}$) comprised between 0.344 and 0.3458 nm.

The characterization of the carbon structure of coke is conducted on the basis of the analysis of powder X-ray diffraction (XRD) patterns. XRD patterns from coke powders inside a spinning probe holder are measured (intensity versus °2θ) using a diffractometer Bruker D8 Discover operating with a divergence slit having a fixed aperture of 0.3°. The X-ray source emits Cu-Kα radiation with an acceleration voltage of 40 kV and a current of 40 mA. The performances of the diffractometer (proper diffracted angle and intensities) are controlled with NIST standards SRM660b (LaB6) and SRM 1976b (sintered alumina disc prepared from alumina powders with corundum structure) to insure that they remain within Bruker 'specifications.

After the coke powders are filled into an annular sample holder (1-2 mm depth) resting on a glass slide, the powders are packed using a manual press and excess powders scraped off; then a cover lid is put on the top of the packed coke powders and the whole assembly (glass plate, ring with packed powder inside, cover lid) turned over, followed by removal of the glass slide revealing a smooth flat surface for subsequent X-ray diffractometer analysis.

Diffracted intensities are recorded, starting at 2θ 10° and ending at 85°. A step-scan procedure is performed with 0.02° step size and an acquisition time of 1 s at each angle. This acquisition procedure is very close to those used by F. R. Feret and Iwashita et al. The size of carbon crystallites (average stack height, Lc) is estimated from FWHM (full width at half maximum) of diffraction peak [002] using Scherrer's formula. The software DIFFRAC.EVA (XRD software DIFFRAC.SUITE from Bruker) is used to determine the angular full width at half maximum (FWHM) β in radians.

$$L_c(\text{nm}) = \frac{0.89 * 0.154}{\beta * \cos(\theta)}$$

F. R. Feret, "*Determination of the crystallinity of calcinated and graphitic cokes by X-ray diffraction*", *Analyst*, 123, 595 (April 1998).

N. Iwashita, C. Rae Park, H. Fujimoto, M. Shiraishi, and M. Inagaki, "*Specification for a standard procedure of X-ray diffraction measurements on carbon materials*", *Carbon*, 42, 701 (2004)

The graphitization degree g, as introduced by Maire and Méring, is calculated from diffraction peak [002] position. A powder silicon standard NIST (National Institute of Standards & Technology) SRM 640d is blended (5%) with coke powder. The certified value for [111] diffraction plane of silicon SRM 640d with Cu Kα X-ray source is °2θ=28.441°. A corrected value for [002] peak position is obtained by adding to the observed [002] peak position the difference between certified silicon peak position (28.441°) and observed peak position.

The graphitization degree g is expressed according to Maire and Méring's formula:

$$g=(0.344-d_{002})/(0.344-0.3354)$$

wherein $d_{002}$ is the lattice spacing in nm.

J. Maire and J. Mering, in "*Chemistry and Physics of Carbon*", Marcel Dekker, New York, 1970; See also: J. Maire and J. Méring, *Proc. 4$^{th}$ Conference on Carbon*, p. 345, Pergamon Press, New York 1960 based on C. R. Houska and B. E. Warren, *X-Ray study of the graphitization of carbon black*", *J. of Applied Physics*, 25, 1503 (1954).

It is preferred to use full width at half peak maximum [002] as a criterion to differentiate coke graphitic crystallinity since the peak values are not very sharp and addition of an internal standard (silicon) with a sharp well-defined peak is mandatory for precise determination of $d_{002}$ spacing, as reported by N. Ishigawa et al. Carbon, 42, 701 2004.

The inventors have observed that incorporation of the coke particles in the vinyl aromatic polymer foam does not affect the X-ray diffraction (XRD) pattern.

In the manufacturing process of the present invention, the vinyl aromatic polymer leaves the polymerization reactor in a molten state. The obtained melt stream is then divided in a main polymer melt stream and an additional polymer side stream.

The additional polymer melt stream is deviated to a dynamic or a static mixing equipment, preferably an extruder, where the comminuted coke and foam cell regulator are fed to and dispersed in the polymer melt, at a temperature comprised between 160 and 250° C., preferably between 170 and 240° C., more preferably between 180 and 230° C., whereupon the additional polymer melt stream recombines with the main polymer melt stream to result in a polymer melt comprising, with respect to the overall weight of the resulting polymer melt, between 3 and 8% by weight, preferably between 3 and 7% by weight, more preferably between 4 and 6% by weight of comminuted coke and between 0.05 and 5% by weight and preferable between 0.05 and 3.5% by weight of foam cell regulator.

Various kinds of cell regulators working according to various mechanism are known in the field of polymer foams. Inert particles at polymer melt temperatures such as talc; titanium dioxide; clays such as kaolin; silica gel; calcium polysilicate; gypsum; metal particles; calcium carbonate; calcium sulfate; magnesium carbonate; magnesium hydroxide; magnesium sulfate; barium sulfate; diatomaceous earth; nano-particles such as nano-particles of calcium carbonate, nano clay and nano-graphite work by adsorbing microscopic (mainly liquid) blowing agent particles and improving the dispersion of those particles in the polymer matrix.

Other cell regulators, called chemical cell regulators, such as citric acid, sodium bicarbonate or other products with decomposition temperatures in the range of the polymer melt temperatures work as bubble initiators in the polymer matrix trough the decomposition of the salt releasing $CO_2$.

Finally, various molecules, the so called nucleating agents, are also known as cell regulators as they influence the crystallinity of a polymer and thereby the solubility of the blowing agent (n-pentane/iso-pentane) in the polymer matrix. Typical products considered as nucleating agents, in particular for semi crystalline or crystalline polymers are esters of abietic acids, polyoxyethylene sorbitan monolaurate, Montan wax, Candelilla wax, Carnauba wax, Paraffine wax, Ceresine wax, Japan wax, Petrolite wax, Ceramer wax, polyethylene wax, polypropylene wax and mixtures thereof.

A foam cell regulator of particular interest within the scope of the present invention comprises polyethylene wax.

Examples of polyethylene wax, particularly suitable for being used in the expandable vinyl aromatic compositions, are high density polyethylene waxes characterized by a weight average molecular weight in the range of from 1000 to 5000 Da and a polydispersity (Mw/Mn) of less than 2.0, preferably less than 1.3, more preferably less than 1.2.

The foam cell regulator is added in such a way that the final expandable vinyl aromatic polymer comprises between 0.01 and 1.0% by weight, preferably between 0.05 and 0.50% by weight of polyethylene wax.

The use of a molten vinyl aromatic polymer stream as a matrix for the coke particles allows a particular soft treatment of those particles during the dispersion process.

Alternatively, a master batch of vinyl aromatic polymer, comprising between 15 and 50% by weight of comminuted coke particles is prepared accordingly the above proper dispersion conditions.

Subsequently the master batch along with vinyl aromatic polymer and the other optional components are fed to the extruder in such an amount that the resulting extrudate, comprises between 3 and 10% by weight, preferably between 3 and 8% by weight, more preferably between 4 and 6% by weight, with respect to the overall weight of the resulting extrudate, of coke particles.

The foams derived from the expanded vinyl aromatic polymers, comprising the coke particles, are used, not only because the thermal insulating effect is significantly improved, but also because they allow the addition of a reduced amount of fire retardant agent for the case that fire retardancy with B2 rating, in accordance to DIN 4102-1, is required.

The components that are used as the flame retardant agents—usually halogenated products—are relatively expensive, so that the molded bodies comprising the comminuted coke particles, according to the invention, are considerably less expensive and can also be produced so as to be more environmentally compatible.

The flame-retardant agents particularly suitable for being used in the expandable vinyl aromatic compositions are chlorinated and/or brominated polymers, aliphatic, cycloaliphatic and aromatic brominated compounds, such as hexabromocyclododecane, pentabromomonochlorocyclo hexane, tetrabromobisphenol A bis(allyl ether) and pentabromophenyl allyl ether; among the above tetrabromobisphenol A bis(allyl ether) and brominated polymers are preferred.

The flame-retarded polymer foams obtained from the vinyl-aromatic polymers of the present invention generally comprise, based on the polymer foam, an amount in the range from 0.2 to 10% by weight, preferably in the range from 0.2 to 5% by weight of aliphatic, cyclo-aliphatic and aromatic brominated compounds. Amounts of from 1 to 10% by weight, based on the polymer foam, ensure adequate flame retardancy, in particular for foams made of expandable polystyrene.

The flame-retarded polymer foams obtained from the vinyl-aromatic polymers of the present invention alternatively comprise, based on the polymer foam, an amount in the range from 0.1 to 5% by weight, preferably in the range from 0.2 to 3% by weight of the halogenated polymers.

The weight average molecular weight, determined by means of gel permeation chromatography against polystyrene standards, of the halogenated, preferably brominated polymers, used as flame retardant, is preferably in the range from 5 kDa to 300 kDa, in particular from 30 kDa to 200 kDa.

The weight loss from the halogenated polymer in thermogravimetric analysis (TGA) is 5% by weight at a temperature of 250° C. or higher, preferably in the range from 270 to 370° C.

The bromine content of preferred halogenated polymers is in the range from 20 to 80% by weight, preferably from 40 to 80% by weight.

Halogenated polymers preferred as flame retardant are brominated polystyrene or styrene-butadiene block copolymer having bromine contents in the range from 40 to 80% by weight.

Other halogenated polymers preferred as flame retardant are polymers having tetrabromobisphenol A units (TBBPA), for example tetrabromobisphenol A diglycidyl ether compounds.

The effectiveness of the halogenated fire retardant agent can be still further improved via addition of suitable flame retardant synergists, examples being the thermal free-radical generators dicumyl, dicumyl peroxide, cumyl hydroperoxide, di-tert-butyl peroxide, tert-butyl hydroperoxide, or a mixture thereof. Another example of suitable flame retardant synergist is antimony trioxide. Flame retardant synergists are generally used in amounts of from 0.05 to 5% by weight, preferably of from 0.1 to 3% by weight, based on the polymer foam, in addition to the halogenated flame retardant agent.

Preferably, the halogenated fire retardant agent and the flame retardant synergist are added to the vinyl aromatic polymer via a separate mixing unit, such as an extruder, at a temperature comprised between 170 and 210° C., preferably between 180 and 200° C., the mix (extrudate) subsequently joining the polymer stream, for example through a static mixer.

Expandable vinyl aromatic polymers are vinyl aromatic polymers comprising blowing agent. The vinyl aromatic polymer melt generally comprises from 2% to 10% by weight, preferably from 3% to 7% by weight of one or more blowing agents distributed homogeneously. Suitable blowing agents are the physical blowing agents usually used in expandable styrene polymers e.g. aliphatic hydrocarbons having from 2 to 7 carbon atoms, alcohols, ketones, ethers, or halogenated hydrocarbons. Preferred blowing agents are isobutane, n-butane, isopentane, or n-pentane, preferably blends of isopentane and n-pentane. On the other hand sustainable blowing agents such as water or supercritical carbon dioxide may be used.

The expandable vinyl aromatic polymers further can comprise the usual and known auxiliaries and additives, examples being, fillers, UV stabilizers, chain-transfer agents, plasticizers, antioxidants, soluble and insoluble inorganic and/or organic dyes and pigments.

It is advantageous that the molded foams have a density of 18 kg/m$^3$, or less preferably of 16 kg/m$^3$ or less.

The molded foam can exhibit a thermal conductivity of 32 mW/m·K or less, even of 31 mW/m·K or less.

Various processes can be used to produce the particularly preferred expandable vinyl aromatic polymers. After the polymerization process, the melt stream is divided into a main polymer stream (1) and an additional polymer side stream (2) (FIG. 1). The side stream constitutes a loop to take up the first additive package, for example coke and foam cell regulator.

In a preferred embodiment, comminuted coke particles are taken as starting point together with foam cell regulator. These components are simultaneously fed into the additional polymer side stream of the vinyl aromatic polymer via a mixing unit, preferably via an extruder. After dispersion of the first additive package, said additional polymer stream joins again the main polymer stream, both in the molten stage, preferably through a static mixer, whereupon blowing agent is added.

The vinyl aromatic polymer melt comprising blowing agent, coke particles, foam cell regulator and in a later stage flame retardant agent and synergist, after homogenization, is rapidly cooled under pressure in order to avoid foaming. It is therefore advantageous to carry out underwater pelletizing in a closed system under pressure.

Particular preference is given to a process comprising the steps of:
a) producing a polymer melt stream after the polymerization process;
b) deriving a part of said polymer melt stream and creating a main polymer melt stream (1) and an additional polymer melt stream (2);
c) using an extruder for incorporating the comminuted coke particles and the foam cell regulator into the additional polymer melt stream (2) at a temperature of at least 160° C., preferably comprised between 180 and 250° C., more preferably between 200 and 240° C., most preferably between 210 and 230° C.;
d) merging the main (1) and the additional (2) polymer melt streams, forming a new polymer melt stream containing the dispersed coke and foam cell regulator;
e) introducing a blowing agent into the new polymer melt stream;
f) cooling the vinyl aromatic polymer melt comprising all necessary ingredients to a temperature of 200° C. or less, preferably a temperature comprised between 120° C. and 200° C.;
g) introducing the flame retardant agent and the synergist into the new polymer melt stream;
h) discharging through a die plate with holes, the diameter of which at the exit from the die is comprised between 0.3 and 1.5 mm, preferably about 0.5-1.0 mm; and
i) pelletizing the melt comprising blowing agent directly downstream of the die plate under water at a pressure above 3 bar, preferably above 5 bar.

The pellets (beads, granules) can then further be coated and processed to give expanded vinyl aromatic polymer foams, in particular polystyrene foams.

In a first step, the expandable vinyl aromatic polymer pellets of the invention can be prefoamed by using hot air or steam, in what are known as prefoamers, to give foam beads of density in the range from 8 to 200 kg/m³, in particular from 10 to 50 kg/m³ preferably from 10 to 20 kg/m³. Eventually, in order to reach the lower densities a second prefoaming step can be applied. After maturation, in a next step the prefoamed beads (to which a coating has been applied) are placed in molds where they are treated with steam and where they are further expanded and fused to give molded foams.

EXAMPLES

The examples in Tables 1 and 2 illustrate the invention; they are merely meant to exemplify the present invention but are not destined to limit or otherwise define the scope of the present invention. Examples 1 to 6 are according to the present invention; Examples 7 to 9 are comparative.

All the self-extinguished (SE or FR) examples (Examples 2 to 9) comprise 0.15% by weight of wax with a weight average molecular weight Mw of 2 kDa, 1.2% by weight of Emerald Innovation™ 3000 (Chemtura) and 0.33% by weight, of 2,3-dimethyl-2,3-diphenylbutane (synergist). The foam panels derived all have B2 rating (DIN 4102).

The expandable foam of Example 1 is free of flame retardant agent and flame retardant synergist yet further being identical (composition and processing parameters) to the expandable foam of Example 2; minor to no influence on thermal conductivity values is perceived.

In Table 1, the thermal conductivity (λ, in mW/m·K) is given for a foam density (ρ) of respectively 12.5, 15 and 18 g/l for a foam comprising respectively 6% by weight (value before the slash symbol) and 4.5% by weight (value after the slash symbol) of coke.

In this table is additionally reproduced:
D10: diameter where 10% by volume of the distribution has a smaller particle diameter and 90% by volume has a higher particle diameter;
D50: diameter where 50% by volume of the distribution has a smaller particle diameter and 50% by volume has a higher particle diameter;
D90: diameter where 90% by volume of the distribution has a smaller particle diameter and 10% by volume has a higher particle diameter;
(D90–D10)/D50: the span quantifying the distribution width;
% vol.<1 μm: the volume percentage of particles with a diameter of less than 1 μm;
% vol of particles with a diameter of less than 1 μm calculated according to 36–13*(ln D50) (value before the slash symbol) and to 32–12 ln D50 (value after the slash symbol).

In Table 2, the particle size and the particle size distribution of the coke particles before introducing into the vinyl aromatic polymer (as received from the supplier) is compared to the particle size and the particle size distribution of the coke particles after being dispersed into the polymer melt according to the method of the present invention. In the same table, the structure characteristics of the coke particles are given, wherein:
the degree of graphitization is given by $(d_{002}-0.344)/(0.3354-0.344)$ with $d_{002}$ being the interlayer spacing; 0.3345 being the interlayer spacing of highly graphitized carbons and 0.344 being the interlayer spacing for a typical non-graphitic carbon;
$L_c$ is the crystallite stacking height;
$d_{002}$ is the average interlayer spacing.

All examples answer the criteria for volume median particle diameter (D50), span (D90–D10)/D50), volume percentage of particles with a diameter of less than 1 μm and structure characteristics (g, Lc, $d_{002}$). As can be seen in Table 1, the expanded polystyrene foams of Examples 1 to 6, according to the invention, all are characterized (for coke percentage of 4.5% and more) by a thermal conductivity of 32 mW/m·K or less for a foam density of 12.5 kg/m³, by a thermal conductivity of 31 mW/m·K or less for a foam density of 15 kg/m³ and by a thermal conductivity of 30.5 mW/m·K or less for a foam density of 18 kg/m³.

For Examples 7 to 9 (comparative examples), thermal conductivity values of more than 32 mW/m·K are measured for expanded foams with a foam density of 12.5 kg/m³ and of more than 31 mW/m·K for expanded foams with a foam density of 15 kg/m³ each comprising 6% by weight of coke.

In:
Example 7, the volume median particle diameter (D50) is higher than 5 μm (9.15 μm);
Example 8, the span is higher than 2.5 (2.73) and the volume median particle diameter (D50) is higher than 5 μm (7.85 μm) while the volume percentage of particles with a diameter of less than 1 μm (10.6) is higher than 36-13 ln D50 being 9.2;
Example 9, the volume median particle diameter (D50) is higher than 5 μm (6.1 μm) while the crystallite stacking height (Lc) is lower than 4 nm (2.6 nm).

As appears from Table 2, the soft dispersion conditions result in a particle size distribution for which the span differs by less than 1, in absolute value, from the span of the particles before dispersion (as received). Processing in extruders induces an increase of the percentage of particles with a diameter below 1 μm. Soft dispersion conditions result in a reduced increase of said percentage.

TABLE 1

| Example | D10 (μm) | D50 (μm) | D90 (μm) | (D90 − D10)/D50 | % vol. < 1 μm | 36-13 lnD50/ 32-12 lnD50 | Thermal conductivity (λ) in mW/m · K a.f.o. foam density (ρ) in g/l | | |
|---|---|---|---|---|---|---|---|---|---|
| | | | | | | | 12.5 kg/m³ | 15 kg/m³ | 18 kg/m³ |
| 1 | 1.09 | 4.08 | 8.25 | 1.75 | 9 | 17.7/15.1 | 30.9/31.5 | 30.2/30.7 | 29.7/30.1 |
| 2 | 0.51 | 2.62 | 5.78 | 2.01 | 20.2 | 23.5/20.4 | 30.6/31.3 | 30.0/30.5 | 29.6/30.0 |
| 3 | 0.52 | 2.47 | 5.7 | 2.10 | 23.0 | 24.2/21.2 | 30.6/31.2 | 30.0/30.5 | 29.6/30.0 |
| 4 | 0.59 | 2.00 | 5.02 | 2.22 | 20.9 | 27.0/23.7 | 30.8/31.5 | 30.3/30.8 | 29.9/30.3 |
| 5 | 1.13 | 4.18 | 8.42 | 1.74 | 8.7 | 17.4/14.8 | 30.9/31.6 | 30.3/30.8 | 29.8/30.1 |
| 6 | 0.95 | 4.07 | 8.34 | 1.82 | 10.6 | 17.8/15.2 | 30.9/31.6 | 30.2/30.7 | 29.7/30.1 |
| 7 | 1.84 | 9.15 | 18.55 | 1.83 | 4.7 | 7.2/5.4 | 32.8 | 31.8 | 31.1 |
| 8 | 0.94 | 7.85 | 22.37 | 2.73 | 10.6 | 9.2/7.2 | 32.9 | 31.9 | 31.2 |
| 9 | 2.39 | 6.10 | 10.30 | 1.30 | 6.0 | 12.5/10.3 | 34.5 | 33.1 | 31.9 |

TABLE 2

| | Particle size distribution (PSD) of coke as received | | | | | | | | PSD coke in EPS foam | |
|---|---|---|---|---|---|---|---|---|---|---|
| Example | D10 (μm) | D50 (μm) | D90 (μm) | (D90 − D10)/D50 | % vol. < 1 μm | Degree of graphitization | Lc (nm) | $d_{002}$ (nm) | D50 (μm) | (D90 − D10)/D50 |
| 1 | 1.54 | 4.76 | 8.80 | 1.53 | 4.9 | −0.12 | 7.7 | 0.345 | 4.08 | 1.75 |
| 2 | 0.87 | 3.07 | 6.29 | 1.77 | 12.1 | −0.12 | 5.2 | 0.345 | 2.62 | 2.01 |
| 3 | 0.83 | 2.67 | 5.46 | 1.73 | 13.1 | −0.12 | 5.2 | 0.345 | 2.47 | 2.10 |
| 4 | 1.12 | 2.85 | 6.81 | 2.00 | 7.9 | 0.00 | 5.5 | 0.344 | 2.00 | 2.22 |
| 5 | 1.33 | 4.27 | 8.23 | 1.62 | 6.4 | 0.01 | 7.7 | 0.344 | 4.18 | 1.74 |
| 6 | 1.33 | 4.27 | 8.23 | 1.62 | 6.4 | 0.01 | 7.7 | 0.344 | 4.07 | 1.82 |
| 7 | 3.49 | 10.32 | 18.57 | 1.42 | 0.7 | −0.12 | 5.1 | 0.345 | 9.15 | 1.83 |
| 8 | 2.77 | 12.28 | 27.51 | 2.01 | 2.3 | −0.12 | 4.3 | 0.345 | 7.85 | 2.73 |
| 9 | 4.66 | 6.80 | 9.69 | 0.74 | 1.0 | −0.30 | 2.6 | 0.3466 | 6.10 | 1.30 |

The invention claimed is:

1. Expandable vinyl aromatic polymers comprising at least one blowing agent and a plurality of dispersed coke particles, said dispersed coke particles being characterized by:
   (i) an average stack height (Lc) of carbon crystallites of at least 4 nm, wherein Lc is given by the formula $$L_c(\text{nm}) = \frac{0.89 * 0.154}{\beta * \cos(\theta)}$$

and is estimated from the full width at half maximum of diffraction peak [002];
   (ii) a volume median particle diameter (D50) comprised between 1 and 5 μm, as obtained from laser light scattering measurements according to ISO 13320; and
   (iii) a span (D90−D10)/D50 below 2.5 as obtained from laser light scattering measurements according to ISO 13320;
   wherein the expandable vinyl aromatic polymers comprise between 4 and 6% by weight of the dispersed coke particles; and
   wherein polymer foams obtained from the molding of expanded polymer pellets of the expandable vinyl aromatic polymers comprise a thermal conductivity, (λ), measured according to ISO 8301, of 31.0 mW/mK or less at a foam density of 12.5 kg/m³ or higher.

2. The expandable vinyl aromatic polymers according to claim 1 characterized in that a volume percentage of the dispersed coke particles with a diameter of less than 1 μm is lower than (36−13 ln D50) (36 minus 13 times the natural logarithm of D50).

3. The expandable vinyl aromatic polymers according to claim 1 characterized in that a volume percentage of the dispersed coke particles with a diameter of less than 1 μm is lower than (32−12 ln D50) (32 minus 12 times the natural logarithm of D50).

4. The expandable vinyl aromatic polymers according to claim 1 comprising between 2 and 10% by weight of a C3-C6 alkane.

5. The expandable vinyl aromatic polymers according to claim 1 additionally comprising:
   (i) between 0.1 to 5% by weight of a halogenated polymer;
   (ii) between 0.05 and 5% by weight of a flame retardant synergist; and
   (iii) between 0.01 and 1.0% by weight of polyethylene wax, as cell regulator, characterized by a weight average molecular weight comprised between 1500 and 5000 Da.

6. A process for the preparation of pellets of expandable vinyl aromatic polymers, said process comprising the steps of:
   a. producing a polymer melt stream of expandable vinyl aromatic polymers
   b. deriving a part of said polymer melt stream and creating a main polymer melt stream (1) and a side loop with an additional polymer melt stream (2);
   c. dispersing a plurality of coke particles and a foam cell regulator into said additional polymer melt stream (2), said plurality of coke particles being characterized by:

(i) an average stack height (Lc) of carbon crystallites of at least 4 nm, wherein Lc is given by the formula $$L_c(\text{nm}) = \frac{0.89 * 0.154}{\beta * \cos(\theta)}$$

and is estimated from the full width at half maximum of diffraction peak [002];
    (ii) a volume median particle diameter (D50) comprised between 1 and 7 µm, as obtained from laser light scattering measurements according to ISO 13320; and
    (iii) a span (D90–D10)/D50 below 3.0 as obtained from laser light scattering measurements according to ISO 13320;
d. joining the additional polymer melt stream (2) and the main polymer melt stream (1) to form a new polymer melt stream;
e. introducing a blowing agent into the new polymer melt stream;
f. cooling the new polymer melt stream comprising all ingredients down to a temperature of 200° C. or less;
g. discharging the new polymer melt stream through a die plate with holes; and
h. pelletizing the new polymer melt stream under water with a pressure above 3 bar;
wherein the dispersing is such that the pellets of expandable vinyl aromatic polymers comprise between 4 and 6% by weight of coke;
wherein the dispersed coke particles are characterized by:
(i) an average stack height (Lc) of carbon crystallites of at least 4 nm,
(ii) a volume median particle diameter (D50) comprised between 1 and 5 µm as obtained from laser light scattering measurements according to ISO 13320; and
(iii) a span (D90–D10)/D50 below 2.5 as obtained from laser light scattering measurements according to ISO 13320; and
wherein polymer foams obtained from the molding of expanded vinyl aromatic polymer pellets of the expandable vinyl aromatic polymers comprise a thermal conductivity ($\lambda$), measured according to ISO 8301, of 31.0 mW/mK or less at a foam density of 12.5 kg/m³ or higher.

7. The process according to claim 6 comprising the additional step of introducing a flame retardant agent and a synergist into the new polymer melt stream between step f) and step g).

8. The process according to claim 6, wherein between 5 and 30% of the polymer melt stream is derived in step b) to form the additional polymer melt stream (2).

9. The process according to claim 6, wherein in step c), the plurality of coke particles and the foam cell regulator are dispersed into the additional polymer melt stream (2) by means of an extruder.

10. The process according to claim 6, wherein the dispersing in step c) is performed in the additional polymer melt stream at a temperature comprised between 180 and 250° C.

11. The process according to claim 6, wherein in step g) one or more thermal stabilizer(s) and anti-acid(s) are added.

12. Polymer foams obtained from the molding of expanded polymer pellets of expandable vinyl aromatic polymers comprising at least one blowing agent and a plurality of dispersed coke particles, said dispersed coke particles being characterized by:
    an average stack height (Lc) of carbon crystallites of at least 4 nm; wherein Lc is given by the formula $$L_c(\text{nm}) = \frac{0.89 * 0.154}{\beta * \cos(\theta)}$$

and is estimated from the full width at half maximum of diffraction peak [002];
    a volume median particle diameter (D50) comprised between 1 and 5 µm, as obtained from laser light scattering measurements according to ISO 13320; and
    a span (D90–D10)/D50 below 2.5 as obtained from laser light scattering measurements according to ISO 13320;
    where the expandable vinyl aromatic polymers comprise between 4 and 6% by weight of the dispersed coke particles; and
    wherein said polymer foams are characterized by a thermal conductivity ($\lambda$), measured according to ISO 8301, of 31.0 mW/mK or less at a foam density of 12.5 kg/m³ or higher.

\* \* \* \* \*